United States Patent [19]

Davies

[11] Patent Number: 5,224,442
[45] Date of Patent: Jul. 6, 1993

[54] MILKING APPARATUS

[75] Inventor: Francis J. Davies, Ivanhoe, Australia

[73] Assignee: Daviesway Pty Limited, Victoria, Australia

[21] Appl. No.: 876,058

[22] Filed: Apr. 28, 1992

[30] Foreign Application Priority Data

Apr. 29, 1991 [AU] Australia .................. 76132/91

[51] Int. Cl.⁵ ............................... A01J 5/16
[52] U.S. Cl. ............................. 119/14.49; 119/14.47
[58] Field of Search ............... 119/14.49, 14.47, 14.51

[56] References Cited

U.S. PATENT DOCUMENTS 3,967,587  7/1976  Noorlander ............... 119/14.49

FOREIGN PATENT DOCUMENTS 84111-82  of 0000  Australia .
499796    5/1919   France ................ 119/14.49
409517    5/1934   United Kingdom ........ 119/14.49
912567    12/1962  United Kingdom ........ 119/14.49

Primary Examiner—John G. Weiss
Attorney, Agent, or Firm—Vidas, Arrett & Steinkraus

[57] ABSTRACT

An inflation for a teat cup assembly which reduces the capacity of the inflation to twist radially during the installation process. The inflation has an elongated flexible portion adapted to receive the teat of an animal to be milked and comprises a first end formed with an opening into the interior of said elongated portion which is adapted to receive said teat and which sealingly engages a first open end of a hollow elongated teat cup upon vacuum being applied to the inside of said cup; a middle portion adapted to be received in the second end of the elongated teat cup, said middle portion being formed with a plurality of peripheral flat sections thereon, said flat sections being receivable in a correspondingly shaped opening in the second end of the teat cup, said middle portion being sealingly engaged in the opening in said second end upon vacuum being applied to the inside of said cup; the inflation having a second end adapted to extend from the teat cup and be connected to the vacuum line of a milking machine.

5 Claims, 2 Drawing Sheets

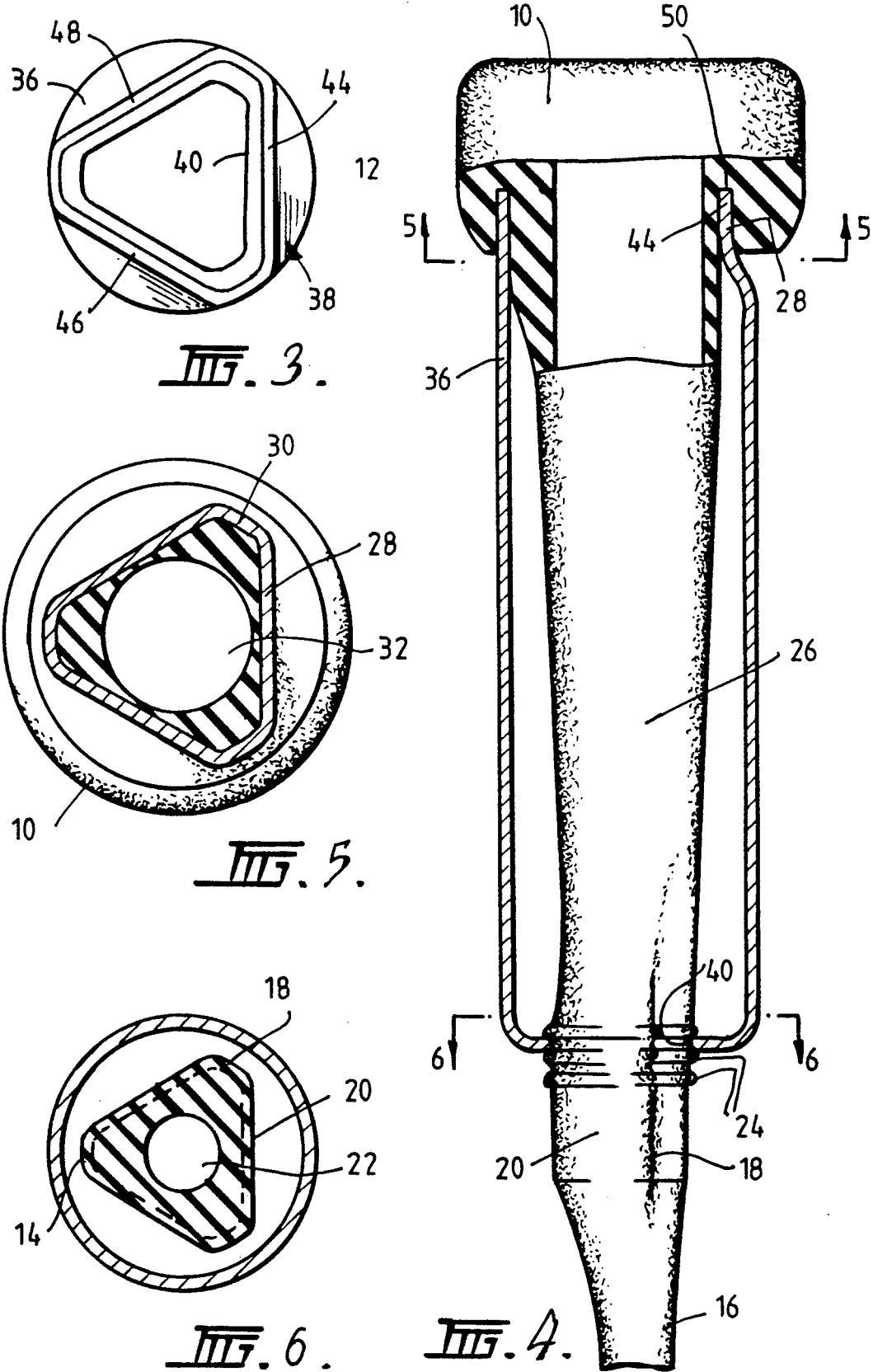

MILKING APPARATUS

BACKGROUND OF THE INVENTION

This invention concerns improvements in or relating to milking apparatus, in particular, the invention is concerned with improvements in or relating to inflations, used in milking machine claw assemblies, which attach to the udder of a cow.

Those skilled in the art will appreciate that a milking machine teat cup claw assembly is composed of four teat cup assemblies, connected via a "claw" to a pulsing mechanism and to the vacuum milk flow line of a milking machine.

A teat assembly is made up a rigid outer teat cup having two open ends in which is positioned a inflation, the inflation usually being made from synthetic rubber.

For the efficient milking of a cow, without risking damage to the teat or udder, the inflation must flex smoothly, and in the manner in which it has been designed. In this way the milking operation is able to extract the maximum amount of milk from the cow without distressing the animal.

The inflations are consumable items, in that they require replacement at regular intervals of time. In some areas, replacement each year is required, and in others, more frequent replacement occurs. If undue wear occurs on the inflation or other deleterious factors apply, then replacement at shorter than usual intervals of time becomes necessary.

Because the inflation must seal against the teat cup at both ends, referred to as the bottom and the top ends, of the cup, to allow the pulsed vacuum applied to the cup of change the shape of the inflation, it is, by necessity, a tight fit at each end of the cup. Removal and replacement of inflations in teat cups, or, installation of inflations in the first instance, requires some effort and produces difficulties in many cases.

It is not uncommon in using milking machine apparatus to find that one or more of the four teat cup assemblies in a claw assembly does not milk satisfactorily. That is to say, it does not extract milk efficiently from the animal being milked. It has been found that this is often attributable to incorrect fitting of the inflation in the cup, due to the difficulties mentioned above, or, the lack of care shown when inserting the inflation into the cup at installation or replacement.

It has been found that what happens is the end of the inflation at the top of the teat cup is twisted radially with respect to that part of the inflation at the bottom end of the teat cup. It is believed that this occurs in the final positioning of the inflation into a sealing contact with the ends of the teat cup. The torsional resilience of the inflation is not sufficient to unwind the radial twisting, once the inflation is fully fitted in the cup. As a result, the milking operation is conducted with the inflation operating with a twist, causing it not to expand and contract as designed, or as desired, for efficient milking. It is believed that premature wearing of the inflation may also occur when it is operated in that condition.

This problem is difficult to identify where the cup itself is not transparent, which is the usual one. This is because it is not possible to inspect the inflation within the cup, once it has been inserted. While a number of solutions to the problem of twisted inflation have been proposed, these suggested solutions are ineffective when inflations are replaced under poor light, or in the dark, as may be the case in milking sheds. In an event, these attempts to solve the problem still rely entirely upon the operator separately checking the alignment of each end of the inflation after it has been inserted in the cup.

SUMMARY OF THE INVENTION

It is an object of the present invention to provide a teat cup inflation which is constructed and configured in such a manner that assembly within a teat cup is achieved which eliminates or minimises the capacity of the inflation to twist radially during the installation process.

In one aspect of the invention there is provided an inflation for a teat cup assembly, the inflation having an elongated flexible portion adapted to receive the teat of an animal to be milked, comprising, a first end formed with an opening into the interior of said elongated portion which is adapted to receive said teat and, which sealingly engages a first open end of a hollow elongated teat cup upon vacuum being applied to the inside of said cup; a middle portion adapted to be received in the second end of the elongated teat cup; a middle portion adapted to be formed with a plurality of peripheral flat sections thereon, said flat sections being receivable in a correspondingly shaped opening in the second end of the teat cup; said middle portion being sealingly engaged in the opening in said second end upon vacuum being applied to the inside of said cup; the inflation having a second end adapted to extend from the teat cup and be connected to the vacuum line of a milking machine.

In one embodiment of the invention the first end of the inflation is also provided with a plurality of peripheral flat sections, which are adapted to be received by corresponding flat portions at the first open end of the teat cup.

The shaped opening in the second end of the teat cup may be formed by flattened portions of a cylindrical cup, which define a shape corresponding to the cross-section of the middle portion, or, by a hole in the rolled over end of the teat cup which corresponds to that cross-section.

In a preferred embodiment of the invention the middle portion of the inflation is triangular or rectangular, and, the second end of the teat cup which receives that portion is of a corresponding shape.

In another embodiment of the invention the first end of the inflation is formed as a rolled over section and the first open end of the teat cup is received underneath that rolled over portion. Where a plurality of flat sections are provided at that end of the inflation, they are provided underneath that rolled over portion and on the outside of the body of the inflation.

As will be appreciated by those skilled in the art, the second end of the inflation referred to above is conveniently formed as a length of flow tube integral with the middle portion. This length of flow tube may be used to assist in insertion of the inflation into the teat cup by providing a part of the inflation which may be grasped by the hand, after being fed through the cup, to allow the inflation to be pulled into position in the cup. The flow tube also provides flexibility of movement of the teat cup assembly after attachment to the vacuum line.

In use, an inflation of this invention is installed in a teat cup in a conventional manner, that is, by inserting the second end through the first and then the second open end of the teat cup and by then pulling the inflation through the teat cup by the second end. Because the middle portion of the inflation, which is to be positioned at the second end of the teat cup, is provided with a plurality of peripheral flat sections, and the cup is provided with an opening at its second end which corresponds in shape to the shape of the middle portion, as the inflation is pulled and/or pushed into the cup the flat sections of the inflation align with the flat portion of the opening and prevent radial twisting of the middle portion and therefore of the inflation with respect to the teat cup as the inflation is moved into its final position, in sealing engagement at both ends of the teat cup.

As is understood by the skilled person, it is necessary that both the top and bottom of the teat cup are sealingly engaged with the top and middle portions of the inflation to ensure that vacuum applied to the interior of the inflation from the flow line, is able to be matched by an equal vacuum applied to the volume between the outside of the inflation and the inside of the teat cup, in a pulsating fashion whereby to cause the inflation to contact and expand against the teat of the animal being milked, during the milking process.

Where the inflation is provided with peripheral flat sections at its first end, then the teat cup is preferably provided with corresponding flattened portions at its first open end. In this situation, as the inflation to being inserted in the teat cup, the flat sections formed on the middle portion engage the corresponding flattened portions of the opening as before, and in addition the flat peripheral sections at the first end of the inflation engage the corresponding flat portions of the first open end of the cup, so that as the inflation is moved into its final position in the cup, relative rotation between the top portion and the middle portion of the inflation, in a radial direction, is not possible.

It is essential to the invention that the configuration of flat sections on the inflation and flat portions at the ends of the teat cup is such that when the inflation is fitted in the teat cup, the part of the inflation within the cup is twist free, that is, the first end portion is aligned with the middle portion.

As the flat sections of the inflation restrain the degree of rotation of the inflation within the teat cup before installation of the inflation is complete, the possibility of twisting of the inflation during installation is substantially removed which results in the inflation being positioned in the teat cup with its open end portion in alignment with its middle portion.

It should be noted that the greater the number of flat sections formed on the inflation, and correspondingly at the ends of the teat cup, the greater would be the possibility that some inadvertent rotation of the inflation to the next series of flats could occur at one part of the inflation and not the other. For that reason, a smaller rather than larger number of flats are desired on the inflation. However this potential inadvertent rotation is reduced if the flat sections are not equally spaced and sized.

In a particularly preferred embodiment, the invention employs an inflation having a generally triangular portion formed at its middle portion and first end portion, with a corresponding triangular shape being provided at the ends of the teat cup into which the inflation is to be inserted. It will be understood that the body of the inflation between the first end and the middle portion may be cylindrical, or, may have other configurations, as desired.

BRIEF DESCRIPTION OF THE DRAWING

In order to more fully describe the invention reference will now be made to a particularly preferred embodiment illustrated in the accompanying drawings, in which:

FIG. 3 is plan view of the teat cup of FIG. 2;

FIG. 4 is a cross-sectional view of the inflation of FIG. 1 installed in the teat cup of FIG. 2;

FIG. 5 is a cross-sectional view along line 5—5; and

FIG. 6 is a cross-sectional view along line 6—6.

DESCRIPTION OF THE PREFERRED EMBODIMENT(S)

Figures 1, 2:
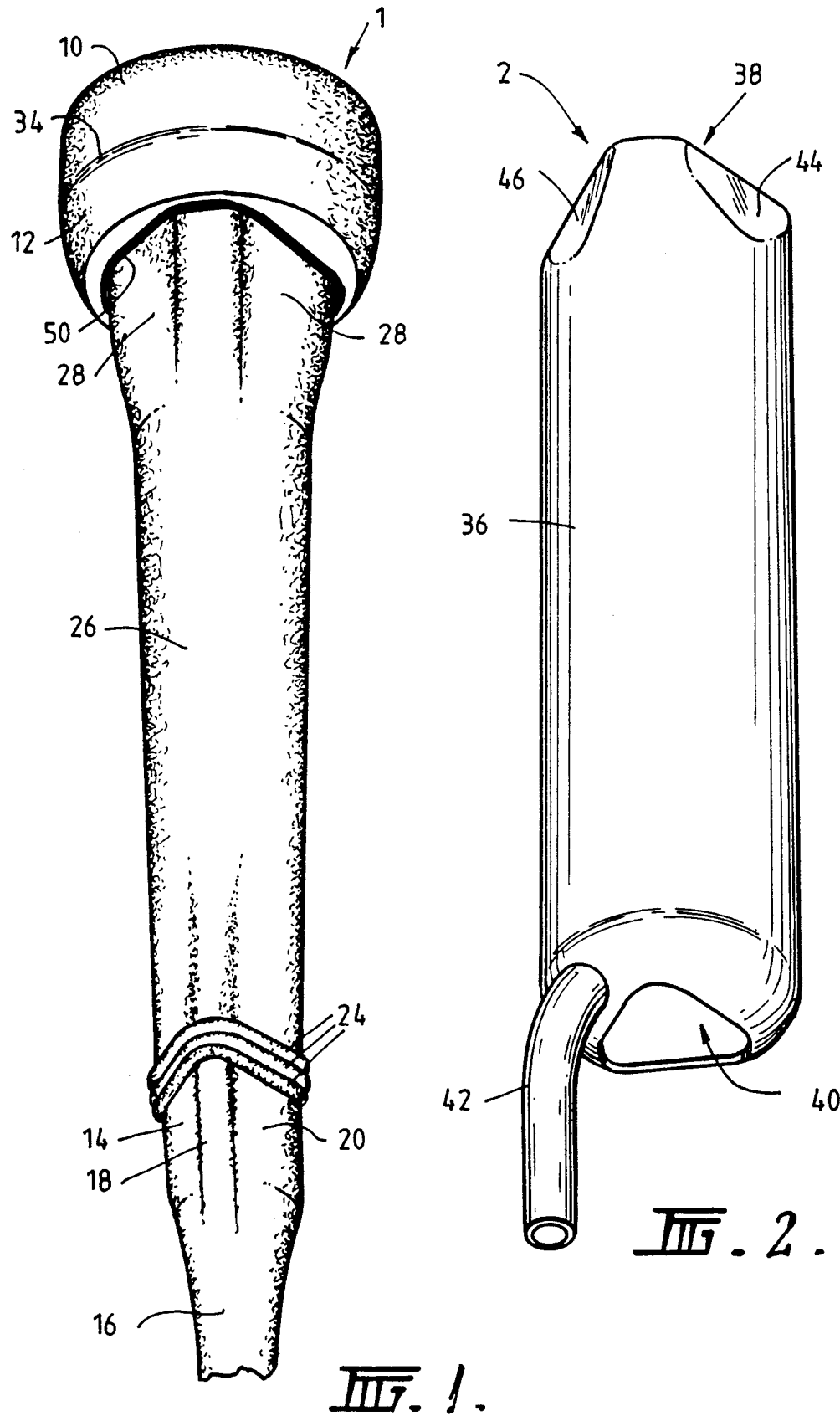
FIG. 1 is a perspective view of an inflation of the invention.
FIG. 2 is an underneath perspective view of a teat cup suitable for use with the inflation of FIG. 1.

Referring to FIG. 1 there is seen an inflation 1 for use with a milking machine, comprising a first end 10 adapted to be received in a teat cup, which is provided with an opening to receive the teat of an animal to be milked. As the opening is on the top of first end 10 it is not seen in this figure. First end 10 is also provided with a rolled over collar 12. Inflation 1 has a middle portion 14 and a second end 16, only part of the latter being shown. Second end 16 is adapted to be connected to the vacuum milk line of a milking machine. Middle portion 14 is provided with a series of flat section 20 joined by rounded corner sections 18. As can be seen from FIG. 6, middle portion 14 is generally triangular in cross-section with a generally circular bore 22 passing therethrough.

Provided on the outside surface of middle portion 14 are a series of retaining hackles 24 whose purpose will be described hereinafter.

Between first end 10 and middle portion 14 is an elongated portion 26 which in use receives the teat of the animal to be milked.

At first end 10 there is provided a series of flat sections 28 joined by rounded corner sections 30. Three flat sections 28 are provided so that, as seen in FIG. 5, the shape of first end 10 is generally triangularly in cross-section with a generally circular bore 32 extending therethrough. Flat sections 28 extend under the rolled over collar 12 to approximately line 34, shown in outline.

Both triangular sections, at first end 10 and middle portion 14 are slightly tapered, reducing in cross-sectional area in the direction of second end 16.

Referring now to FIG. 2 and FIG. 3 there is seen a teat cup 2 comprising a hollow elongated up 36 having a first open end 38 which is not clearly seen in the figure, being at the top of cup 36, and a second open end 40. A vacuum connection 42 is provided adjacent end 40 and will be recognized by the person skilled in this art.

The shape of open end 40 is such as to allow middle portion 14 to be received therein in sealing engagement, when retaining hackles 24 are located on either side of the opening. Thus it can be seen that the shape of open end 40 is generally triangular with rounded corners.

Open end 38 if formed with three flat sections 44, 46 and 48 formed therein, as best seen in FIG. 3. Those sections are conveniently formed by pressing flat sections from a cylindrical body. Open end 38 is thus seen to be generally triangular with rounded corners. Open end 40 is smaller than open end 38, as seen in FIG. 3, and because the flat sections 20 and 28 on inflation 1 are aligned, the flat portions of open end 40 and flat sections 44, 46 and 48 are also aligned. To install inflation 1 in teat cup 2 second end 16 is passed firstly through open-end 38 and then through open end 40. Because the openings are substantially larger than second end 16, it passes through easily.

As middle portion 14 approaches open end 40, flat sections 20 begin to align themselves with the flat portions of end 40 so that an alignment of middle portion 14 within end 40 commences. At the same time flat portion 28 of first end 10 begin to align themselves with flat sections 44, 46 and 48 of end 38.

As the inflation continues to enter teat cup 2, usually by continuing to pull second end 16 through end 40, the flat sections of inflation 1 engage the flat sections of teat cup 2, and as inflation 1 approaches its final position in teat cup 2 it becomes impossible for relative of end 10 and middle 14 to occur.

Thus, upon drawing one, two or all of retaining hackles 24 through end 40, the extremity of end 38 abuts the end of groove 50 and sealing engagement of both ends 38 and 40 of teat cup 2 is made with end 10 and middle 14 of inflation 1, which is now installed and which has the portion retained within teat cup 2 free from any radially induced distortion.

Many variations to the invention may be realised by those skilled in the art, and all such variations are deemed to be within the scope of the invention.

One variation would be to provide both end 38 and end 40 with similar flattened sections to define a shape corresponding to middle portion 14. That is, to provide a series of flats at that end, rather than a hole.

Also, a cross-sectional shape for end 10 and middle 14 other than generally triangular may be envisaged. Such as two sided with rounded ends, rectangular, square and pentagonal. The ends of teat cup 2 would then be required to confirm to those shapes.

Also, flat sections 44, 46 and 48 at open end 38 of the teat cup 2 may be formed by flaring out the sections from a cylindrical body.

I claim:

1. An inflation for use in a teat cup assembly comprising:
   (a) an elongated flexible portion adapted to receive the teat of an animal to be milked; said elongated, flexible portion having a first end formed with an opening into the interior of said elongated flexible portion; said first end being provided with three sections thereon which are flat, both peripherally and longitudinally of the inflation, adapted to be received by three corresponding flat portions provided in a first open end of a hollow elongated teat cup; and a second end of the flexible portion adapted to be received by a second open end of the elongated teat cup; said second end of the flexible portion being provided with three sections thereon which are flat, both peripherally and longitudinally of the inflation, and which are receivable by corresponding straight portions of the opening in the second end of said teat cup; and
   (b) a tubular section extending from the second end of said elongated flexible portion and adapted to be connected to the vacuum line of a milking machine.

2. A teat cup inflation as claimed as claim 1 wherein said first end is provided with a rolled over section is adapted to engage the outside of the teat cup.

3. A teat cup inflation as claimed in claim 2 wherein said three peripheral flat sections on said first end are provided on said elongated flexible portion beneath said rolled over section.

4. An inflation as claimed in claim 1 wherein said three sections form a generally triangular cross-sectional portion of the inflation, at said first and said second ends thereof.

5. A teat cup assembly including:
   (a) a hollow elongated teat cup having first and second open ends; and
   (b) a teat cup inflation comprising;
      (i) an elongated flexible portion adapted to receive the teat of an animal to be milked; said elongated, flexible portion having a first end formed with an opening into the interior of said elongated flexible portion; said first end being provided with three sections which are flat, both peripherally and longitudinally, said sections being received by corresponding flat portions provided in a first open end of a hollow elongated teat cup; and a second end of the flexible portion received by a second end of the elongated teat cup; said second end of the flexible portion being provided with three sections thereon which are flat, both peripherally and longitudinally, and which are receivable by corresponding straight portions of an opening in the second end of said teat cup; and
      (ii) a tubular section extending from the second end of said elongated flexible portion and adapted to be connected to the vacuum line of a milking machine;
   whereby the first end of the teat cup inflation is received in the first end of said teat cup and the second end of the teat cup inflation is received in the second end of said teat cup.

* * * * *

UNITED STATES PATENT AND TRADEMARK OFFICE
CERTIFICATE OF CORRECTION

PATENT NO. : 5,224,442
DATED : July 6, 1993
INVENTOR(S) : Davies, Francis J.

It is certified that error appears in the above—identified patent and that said Letters Patent is hereby corrected as shown below:

Col. 1, line 15, after "up" insert -- of --

Col. 1, line 62, delete "one" and insert -- case --

Signed and Sealed this

Twenty-first Day of September, 1993

Attest:

BRUCE LEHMAN

Attesting Officer

Commissioner of Patents and Trademarks